United States Patent [19]

Doughty

[11] 3,958,359
[45] May 25, 1976

[54] SPORTSMAN'S COMBINATION RECEPTACLE AND ICE CHEST

[76] Inventor: Merlin L. Doughty, 2865 Malibu Court, Titusville, Fla. 32780

[22] Filed: Mar. 12, 1975

[21] Appl. No.: 557,486

[52] U.S. Cl. .................................................. 43/55
[51] Int. Cl.² ........................................... A01K 97/06
[58] Field of Search .................... 43/55, 54.5, 56; 62/371, 372, 457

[56] References Cited
UNITED STATES PATENTS

| | | | |
|---|---|---|---|
| 348,557 | 9/1886 | Haak | 62/371 |
| 2,631,402 | 3/1953 | Lastofka | 43/55 |
| 3,882,628 | 5/1975 | Stouder | 43/55 |

*Primary Examiner*—Warner H. Camp
*Attorney, Agent, or Firm*—Duckworth, Hobby & Allen

[57] ABSTRACT

A sportsman's combination receptacle and ice chest includes a portable base member having a hollow interior and an open top. A container slidably fits in the hollow interior and is dimensioned so as to engage the periphery of the base member interior at a plurality of points, whereby lateral movement of the container is restricted. The periphery of the container is shaped so as to define spaces between the container periphery and the periphery of the base member, such that ice may be placed therein. A cover member fits in the top of the base member and covers both the top of the container and the base member.

10 Claims, 3 Drawing Figures

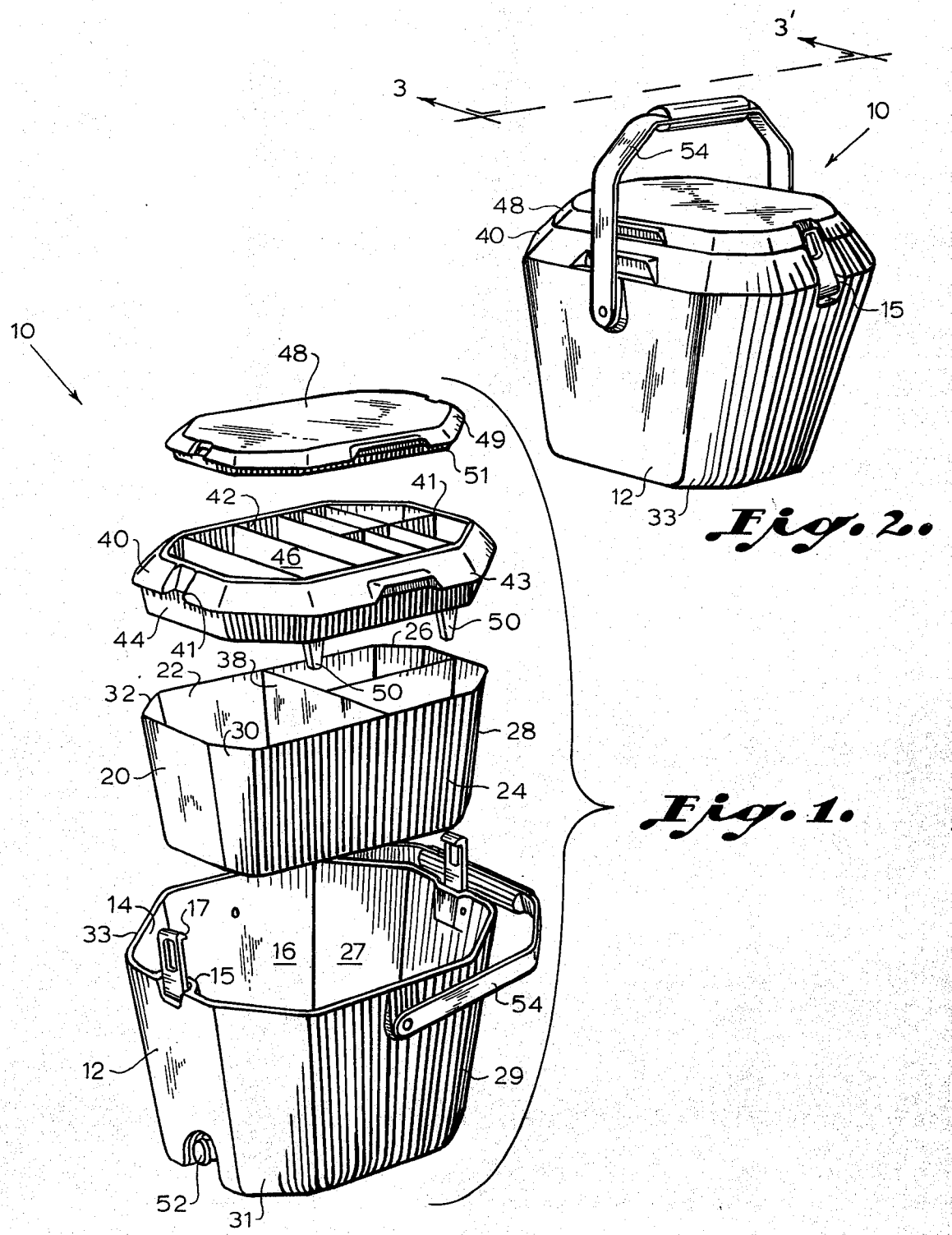

3,958,359

SPORTSMAN'S COMBINATION RECEPTACLE AND ICE CHEST

BACKGROUND OF THE INVENTION

1. Field of the Invention

The present invention relates to portable containers, and in particular, to portable containers for sportsmen and the like, which provide easily accessible and airtight storage, and which may be simultaneously employed as a seat or stool.

2. Description of the Prior Art

Combination bait containers and seats are well known in the art. In U.S. Pat. No. 3,751,845, van Leeuwen discloses a transportable fishing bucket constituting a combined closure and rotatable seat, where live or artificial bait may be stored at the bottom of the container and having an outer seat wherein access to the interior bait container which is had by rotation of the seat. Similar arrangements are found in other United States patents classified in class 43, subclasses 55 and 56, among others.

Jackson, in U.S. Pat. No. 2,919,169, also discloses a sportsman's receptacle which may be employed as a seat. According to Jackson, the top cover member has tiered sections for storage of artificial bait and the like. Similar arrangements are disclosed in U.S. Pat. No. 3,051,540 to Wood; U.S. Pat. No. 3,545,809 to Krenz; and U.S. Pat. No. 2,657,734 to Frost. Pryale, in U.S. Pat. No. 3,114,574, discloses a container employing a combination lid and seat. In U.S. Pat. No. 3,230,006, Sokolis discloses a fisherman's chair having a receptacle portion underneath the seat.

Combination containers of the type described above fall short of the needs of many sportsmen, especially fishermen. Since a fisherman may fish in one place for an extended period of time, it is desirable to be able to clean the fish and place the cleaned fish in a cooler for keeping. Additionally, a fisherman's container must, of necessity, be capable of storing the fisherman's artificial lures and other paraphernalia, including smoking articles, food and the like. However, if the cleaned fish are to be placed in a cooled portion of the container, it is imperative that the fish be isolated from the food and other personal amenities of the fisherman, so as to prevent a "fishy" odor from adhering thereto. It is further desirable to be able to chill food or beverages at the same time cleaned fish are maintained in a chilled state, again, while isolating the fishy odor from the rest of the container's contents.

SUMMARY OF THE INVENTION

The present invention contemplates a sportsman's combination receptacle and ice chest, comprising a portable base member having a hollow interior defined by side and bottom walls, the top of the base member opposite the bottom wall being open so as to allow access to the interior thereof.

The combination receptacle and ice chest further comprises a container slidably fitted into the hollow interior of the base member and having an open top communicating with the top of the base member, the container being dimensioned so that the periphery thereof engages the periphery of the base member interior at a plurality of points, whereby lateral movement of the container is restricted. The periphery of the container is further shaped so as to define spaces between the container periphery and the periphery of the base member interior, to facilitate the addition of cooling substances, such as ice. A cover member is fitted in the top of the base member and covers the container top such that the odors of any substance contained therein are prevented from permeating into the interior of the base member or to another partitioned portion of the container.

In a specific embodiment in accordance with the present invention, the base member is provided with a pedestal extending from the bottom thereof, the container resting upon the pedestal and fitting tightly between the pedestal and the cover member, to further facilitate the prevention of odors permeating from the interior of the container. The cover may serve as a seat upon which the fisherman or sportsman sits during fishing or hunting activities, the weight of the sportsman further facilitating a tight seal between the cover and the top periphery of the container.

THE DRAWINGS

FIG. 1 is an exploded, perspective view of a preferred embodiment in accordance with the present invention.

FIG. 2 is a perspective view of the outside of the container in FIG. 1.

DETAILED DESCRIPTION

Figure 3:
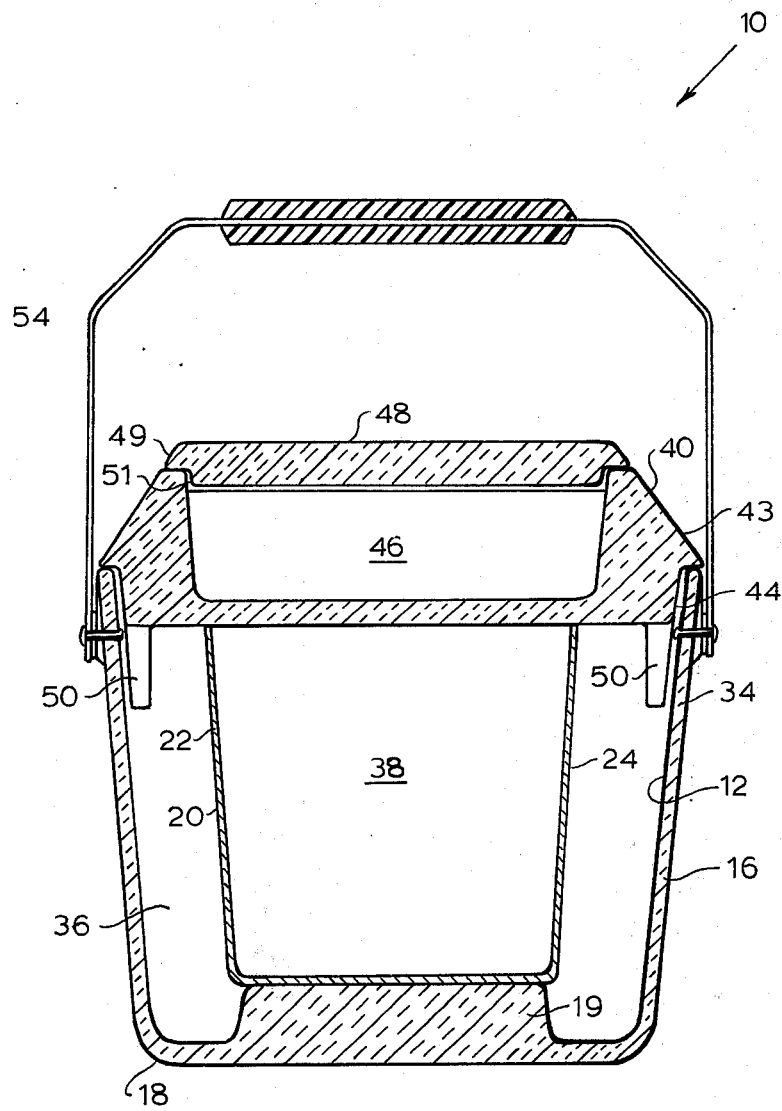
FIG. 3 is a cross-sectioned side view of the container of FIG. 2, taken in the direction reflected by arrows 3–3' in FIG. 2.

A combination sportsman's receptacle and ice chest in accordance with the present invention will now be described with reference to FIGS. 1, 2 and 3.

With specific reference to FIGS. 1 and 3, the receptacle, referred to generally as 10, includes a portable base member 12 having a hollow interior 14 defined by side walls 16 and a bottom wall 18. The top of the base member 12 opposite the bottom wall 18 is open so as to allow access to the hollow interior 14, the top edge thereof having opposing indentations 15 with latches 17 mounted therein. Although not critical, the base member preferably is formed in an octagonal shape, as is clearly shown in FIG. 1. The side wall 16 thus includes four flat side wall portions 27, 29, 31 and 33, which constitute four of the eight sides of the octagonal structure. The base member 12 further includes a riser, or pedestal 19 extending from the central portion of the bottom wall 18 to support a container 20, described next.

With continuing reference to FIGS. 1 and 3, the receptacle 10 further includes a container 20 having a hollow interior 22 defined by an octagonal shape, including four side wall portions 26, 28, 30 and 32, each of which is adapted to form a close, retrofit with the corresponding side wall portion of the base member 12; that is, the four side wall portions of the container 20 and the base member 12 are mated as follows when the container 20 is inserted in the base member 12: 26–27, 28–29, 30–31, and 32–33, so as to restrict lateral movement of the container 20. In accordance with the present invention, each of the four side wall portions 26, 28, 30 and 32 of the container 20 are somewhat shorter than the corresponding side wall portions 27, 29, 31 and 33 of the base member 12, such that two opposing side wall portions 22 and 24 of the container 20 are spaced from the peripheral side wall 16 of the base member 12 when the container 20 is inserted therein. With specific reference to FIG. 3, with the container 20 inserted within the interior 14 of the base member 12, the side wall portions of the container 20 and the base member 12 are in engagement as described previously, the spaces between the long side walls 22 and 24 of the container form voids 34 and 36 between those long walls of the container and the periphery of the base member 12. These voids 34 and 36 suitably allow ice or similar cooling substances to be retained on opposing sides of the container 20 so as to chill cleaned fish and/or food stored within the interior of the container 20.

The receptacle 10 further includes a cover member 40 fitting into the top of the base member 12 and covering the top of the container 20, and having grooves 41 in the periphery thereof to facilitate the latch 15, as described below. Now noting FIG. 3, it will be seen that the cover member 40 includes a peripheral lip 43 which engages the top periphery of the base member 12, and an inner portion 44 extending into the interior 14 of the base member 12 so as to obtain close engagement with the top of the container 20, for the purposes previously described. Preferably, and in accordance with the present invention, the cover member defines a hollow interior 42, both the container 20 and the cover member 40 having respective partitions 38 and 46 for separating portions of the respective interiors thereof. It will be appreciated by those skilled in the art to which the present invention pertains, that the combination of the pedestal 19 and the close engagement of the interior portion 44 of the cover member 40 facilitate a tight fit of the cover member over the top of the container 20, so as to prevent undesirable odors from passing between areas separated by the partition 38, or from entering the interior of the cover member 40.

As shown in FIGS. 1 and 3, legs 50 extend from the bottom of the cover 40 and in close engagement with the inner periphery of the base member 12.

A lid 48 is provided, and has a peripheral lip 49 and inner portion 51 thereof serving purposes similar to that of the lip 43 and inner portion 44 of the cover member 40. The lid 48 is securely fastened over the interior of the cover member 40 and the cover member to the base member 12 by means of the fasteners 15, or other equivalent means, located on the peripheral lip of the base member. The receptacle 10 may suitably be provided with a drain 52 at the bottom of the base member 12, and a pivotable handle 54 mounted at opposing points of the side wall 16 thereof.

With specific reference to FIG. 2, it will be seen that the receptacle 10 in accordance with the present invention may be suitably employed as a seat or stool for the sportsman, during his sporting or fishing endeavors. The receptacle 10 is also suitable for picnics and similar outdoor activities. It will be understood from the detailed description set forth above that undesirable odors of substances stored within the container 20 are effectively prevented from permeating other areas inside the container or the storage area defined by the interior of the cover member 40. Further, the spaced area between the side walls 22 and 24 of the container 20 and the peripheral side wall 16 of the base member allow ice to be inserted therein for purposes of chilling fresh fish or food or beverages, as is desired.

During use, it is often necessary to remove the cover 40 and place it on the ground. The legs 50 extending from the bottom of the cover member 40 prevent large quantities of sand or dirt from entering the container 20. Further, the legs 50 are placed so as to form a snug fit with the inner periphery of the base member 12. The latches 15 allow both the cover 40 and the lid 48 to be firmly fastened to the base member 12, so that the entire receptacle 10 is rendered relatively water-tight and buoyant.

I claim:

1. A sportsman's combination receptacle and ice chest comprising:
    a portable base member having a hollow interior defined by side and bottom walls, the top of said base member opposite said bottom wall being open so as to allow access to said interior thereof;
    a container slidably fitting in said hollow interior of said base member and having an open top communicating with said base member top, said container dimensioned so as to engage the periphery of said base member interior at a plurality of points, whereby lateral movement of said container is restricted;
    the periphery of said container being shaped so as to define spaces between said container periphery and the periphery of said base member interior;
    a cover member fitting in said top of said base member and covering said container top, said cover member having a hollow interior and an open top axial with the open top of said base member; and
    a lid member fitting into said open top of said cover member.

2. A sportsman's combination receptacle and ice chest as recited in claim 1 further comprising at least one partition wall within said container.

3. A sportsman's combination receptacle and ice chest as recited in claim 2 further comprising:
    a pedestal on said bottom wall of said base member and extending into said interior thereof; and wherein
    said container fits between said cover and said pedestal, whereby odors from substances on one side of said partition wall are substantially blocked from passing to another side of said partition wall.

4. A sportsman's combination receptacle and ice chest as recited in claim 3 further comprising:
    at least one partition wall within said cover interior and extending to said top thereof; and
    means for fastening said lid member to said cover member.

5. A sportsman's combination receptacle and ice chest as recited in claim 4, wherein said fastening means further comprises means for fastening said cover member to said base member.

6. A sportsman's combination receptacle and ice chest as recited in claim 5 further comprising a carrying handle pivotably joined at opposite sides of the periphery of said base member.

7. A sportsman's combination receptacle and ice chest as recited in claim 6 further comprising a drain adjacent the junction of said side and bottom walls of said base member.

8. A sportsman's combination receptacle and ice chest as recited in claim 7 wherein said cover member comprises:
    a peripheral lip engaging the periphery of said base member top opening; and
    an inner portion extending into said base member interior so as to effect close engagement with the top of said container.

9. A sportsman's combination receptacle and ice chest as recited in claim 8 wherein said base member and said container have generally octagonal cross-sections, opposing sides of said container being substantially shorter than the corresponding sides of said base member so as to define said spaces.

10. A sportsman's combination receptacle and ice chest as recited in claim 1 further comprising legs extending from said cover member into said base member and snugly against the inner periphery thereof.

* * * * *